April 5, 1932.  A. N. CRAMER  1,852,556
LEER FEEDER
Filed May 31, 1928  3 Sheets-Sheet 1
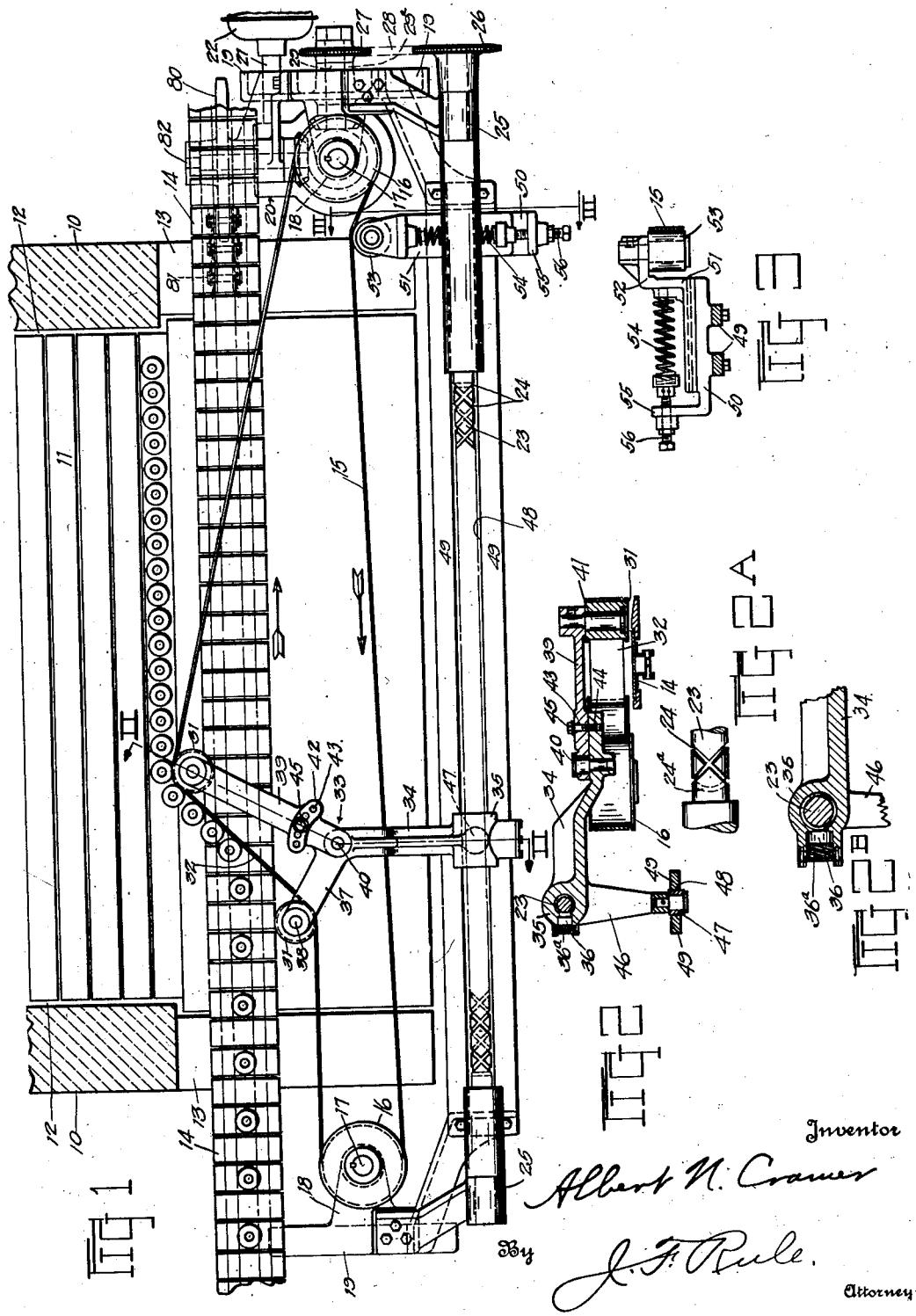
Inventor
Albert N. Cramer
By J. F. Rule.
Attorney

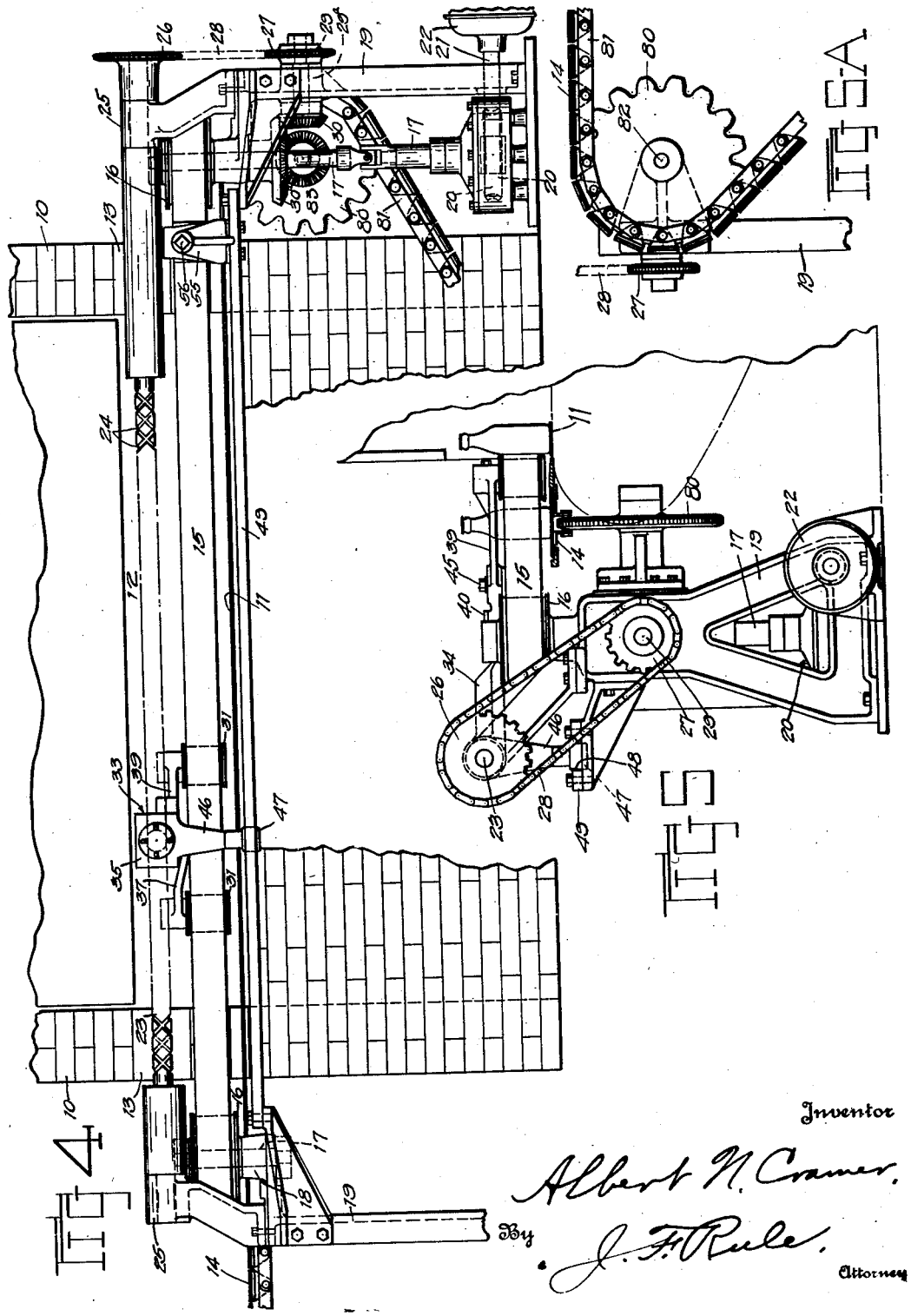

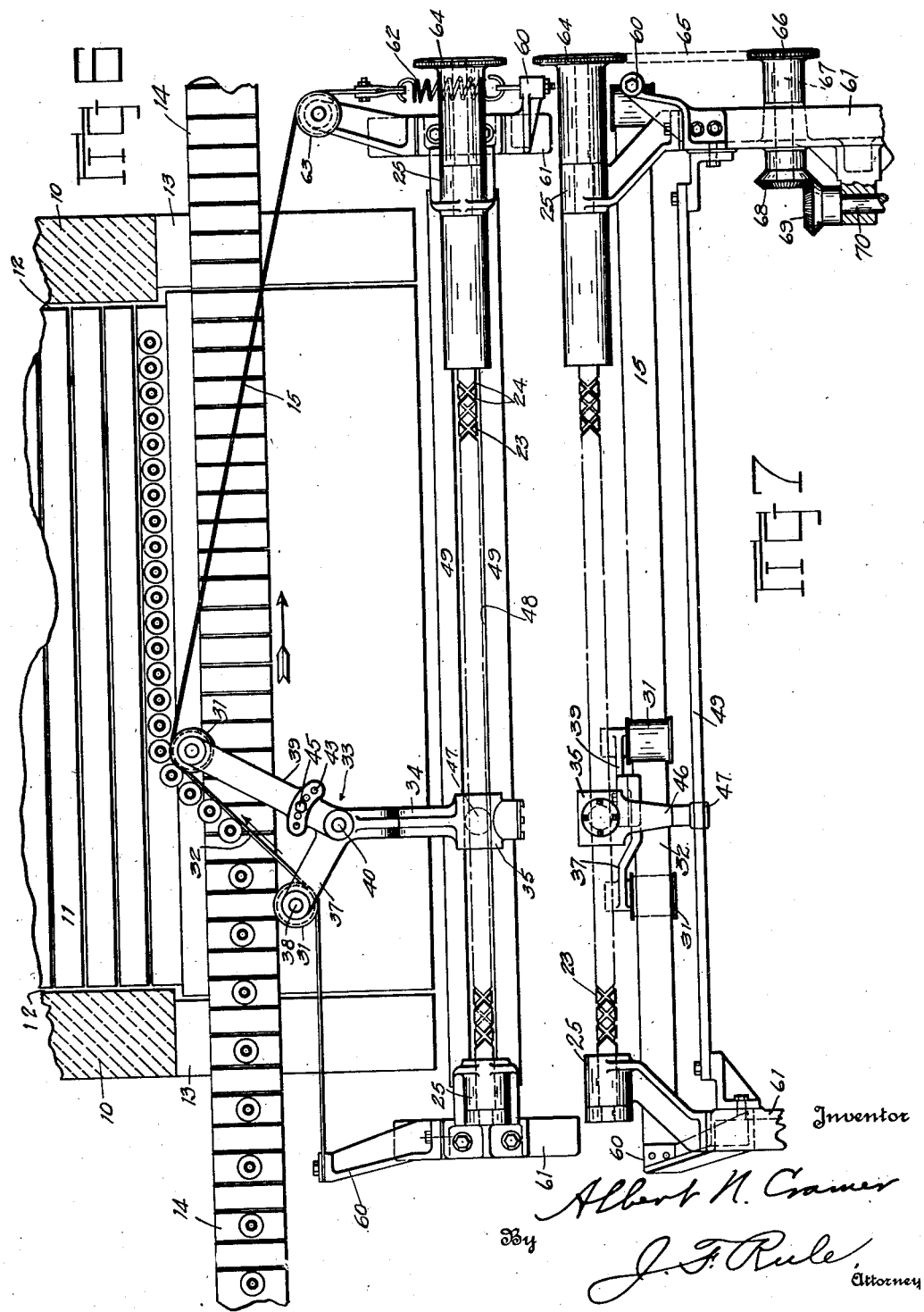

Patented Apr. 5, 1932

1,852,556

UNITED STATES PATENT OFFICE

ALBERT N. CRAMER, OF TOLEDO, OHIO, ASSIGNOR TO OWENS-ILLINOIS GLASS COMPANY, OF TOLEDO, OHIO, A CORPORATION OF OHIO

LEER FEEDER

Application filed May 31, 1928. Serial No. 281,952.

The present invention relates to improvements in leer feeders and particularly to automatic means for placing ware, such as bottles, jars or other articles, in an upright position on a leer conveyor which carries the ware through an annealing chamber for tempering.

An object of the invention is to provide improved means for removing ware from a cross conveyor or hot belt at the forward end of a leer to a position upon the leer conveyor, said means being of such a character that it will not injure the surface of the ware and at the same time will provide for rapid and accurate placing of the ware upon the leer conveyor. To this end, there is provided a frame or carriage extending across the hot belt and guiding a ware pusher belt in a fashion to impart a sliding movement of the ware transversely of the length of the hot belt. This pusher belt is sufficiently flexible to yield slightly under excessive pressure of ware coming in contact therewith and is of a texture to prevent scratching the surface of the ware as is frequently experienced with certain other types of feeders.

Another object is to provide a ware pusher of the above character which is capable of adjustment to accurately control the speed at which ware is removed from the cross conveyor or hot belt.

Other objects will be apparent hereinafter.

In the accompanying drawings:

Fig. 1 is a plan view illustrating one form of the invention.

Fig. 2 is a sectional view along the line II—II of Fig. 1.

Fig. 2—A is a detail view of one end of the screw shaft.

Fig. 2—B is a cross sectional view of the shaft showing the detent or swivel nut engaging the threads.

Fig. 3 is a sectional view taken along the line III—III of Fig. 1.

Fig. 4 is a fragmentary front elevation.

Fig. 5 is an end elevation.

Fig. 5—A is a detail view showing the drive for the hot belt.

Fig. 6 is a plan view of another form of the invention.

Fig. 7 is a fragmentary front elevation of the same.

In the drawings, Figs. 1 to 5—A, inclusive, the leer feeder is illustrated in conjunction with a glassware annealing leer of conventional type, including side walls 10 between which is arranged a leer conveyor 11 for carrying ware through an annealing chamber 12 located between said side walls. This leer conveyor 11 may be of any preferred construction and moved either continuously or intermittently to carry the ware through the leer. The side walls 10 (Fig. 1) are formed with opposed openings 13 through which a continuously moving ware conveyor or hot belt 14 extends for conveying ware transversely of the direction of travel of the leer conveyor 11 to areas within the leer.

Automatic means (Figs. 1 and 2) to remove ware from the hot belt 14 includes an endless pusher belt 15 set on edge and running lengthwise of the hot belt 14 in a plane slightly above the upper surface of the latter. The pusher belt 15 is trained over pulleys 16 and is of such length that portions may be extended across said hot belt and function as a ware pushing device, as will be apparent presently.

These pulleys 16 (Figs. 1 and 4) over which the pusher belt 15 runs, are positioned adjacent the front edge of the ware conveyor 14 or hot belt in proximity to the opposed openings 13 in the side walls of the leer. Vertical shafts 17 carry said pulleys and are journalled in bearings 18 at the upper ends of standards 19. One of these shafts 17 (at the right side of the leer in the present disclosure), extends considerably below its bearing 18 and is connected through a gear and worm mechanism 20 to the shaft 21 on a motor 22. This motor 22 operates to continuously move the pusher belt 15 over the supporting pulleys 16 whereby ware may be removed from the conveyor 14 as will be described.

A shaft 23 extends parallel with the ware conveyor or hot belt 14 in advance of the latter and is formed with double spiral threads 24 comprising part of a mechanism for moving the pusher belt transversely relative to the direction of travel of said ware conveyor. These threads 24 (Fig. 2—A) are connected at each end by a short circumferential thread 24ª which permits reversal of the direction of movement of a carriage 33 hereinafter described. This shaft 23 has its ends journalled in bearings 25 at the upper ends of the standards 19. A sprocket 26 is fixed to one end of this shaft and is connected to another sprocket 27 by a chain 28. The second sprocket 27 is secured to a shaft 29 journalled in a bearing 29ª on one of the standards 19 and carries a bevel gear 30 at its inner end running in mesh with a gear 30ª on the vertical shaft 17. Thus, the means for imparting continuous movement to the pusher belt 15 also functions to rotate the screw shaft 23.

The hot belt 14 is driven by a sprocket 80 running in mesh with the chain 81 connecting the elements making up the belt 14. This sprocket 80 is mounted upon a shaft 82 which carries a bevel gear 83 running in mesh with the aforementioned bevel gear 30, the latter being fixed to the vertical shaft 17 at the right of Fig. 4.

Means to position a portion of the pusher belt 15 across the ware conveyor 14 to move ware from the latter to the leer conveyor 11, includes a pair of rollers 31 arranged above the hot belt 14 for engagement with opposite faces of said pusher belt 15. These rollers 31 (Fig. 1) are positioned adjacent opposite side edges of the hot belt 14 and at points spaced from each other longitudinally of said hot belt. The relative positions of the rollers 31 predetermines the angular relation between the ware pushing portion 32 of the pusher belt 15 and the ware conveyor 14. Feeding of different sized ware into the leer or changing the speed of delivery of ware to the leer may require adjustment of the ware pushing portion 32 to change its angular relation to the line of movement of the hot belt 14. Accordingly, the rollers 31 are mounted upon a carriage 33 constructed to permit various changes in the relative positions of said rollers.

This carriage 33 comprises a bracket 34 formed with a collar 35 through which the shaft 23 extends. The collar 35 carries a detent 36 or swivel nut which engages said double spiral threads 24 upon the shaft 23 one at a time, so that rotation of the shaft causes the carriage 33 to travel back and forth in a direction lengthwise of the shaft. The detent or swivel nut 36 is yieldingly held in engagement with the threads by a spring 36ª. This detent which moves with the carriage 33, travels through the short thread 24ª (Fig. 2—A) from one thread to the other to reverse the direction of travel of the carriage, it being understood that the shaft is continuously rotating. The bracket 34 (Figs. 1 and 2) is formed with a rigid arm 37 at its outer end, said arm extending laterally in a horizontal plane from the bracket 34 and carrying a depending stub shaft 38 upon which one of the rollers 31 is journalled.

An arm 39 is pivoted to a hinge pin 40 rising from the outer end of the bracket 34 and carries at its outer end a depending stub shaft 41 upon which the second roller 31 is journalled. This latter arm 39 is formed with an arcuate plate 42 in which a series of vertical openings 43 is formed, said openings being adapted for register one at a time with an opening 44 in the outer portion of the bracket 34. A removable screw 45 operates to secure the arm 39 in any adjusted relation to the other arm 37 and thereby insures retention of the ware pushing portion 32 of the pusher belt 15 at any predetermined angle relative to the line of travel of the ware conveyor 14.

The roller supporting carriage 33 is held in proper spaced relation above the hot belt 14 by providing the collar 35 with a depending arm 46 which carries a roller 47 at its lower end. This roller runs in a guideway 48 formed between a pair of bars 49 or rails which extend parallel with the shaft 23. Due to the rigid connection between the depending arm 46 and the bracket 34 (Fig. 2), the bars 49 or rails operate to prevent downward tilting of the roller supporting carriage 33 beyond the desired point.

The pusher belt 15 is held taut by a belt tightener (Figs. 1 and 3) comprising a base portion 50 secured to the upper side of the guide rails 49 at one end of the latter and supporting a slide block 51 having a roller carrying arm 52 thereon. A roller 53 on said arm 52 constantly contacts with the adjacent outer face of the pusher belt 15. A coil spring 54 is interposed between upstanding portions 55 on the base 50 and slide block 51 and operates to yieldingly hold said roller 53 in engagement with the pusher belt 15. An adjusting screw 56 is operable to regulate the tension of the spring 54.

In operating the feeder just described, ware is continuously delivered to areas within the feeding end of the leer by the ware conveyor 14 substantially as shown in Fig. 1. The screw shaft 23 is rotated continuously and thereby imparts reciprocatory movement to the carriage 33 and parts carried thereby to project the ware pushing portion 32 of the belt 15 across the path of travel of ware on the hot belt 14.

The conveyor 14 travels continuously from left to right (Fig. 1). At the same time, the carriage 33 is reciprocated lengthwise of the shaft 23. The carriage preferably travels at the same speed as the conveyor 14 so that while the carriage is moving to the right there is no relative movement between it and the conveyor. During this movement of the carriage and conveyor to the right, a row of bottles which have been placed on the conveyor at regular intervals, as shown, is carried into the leer. When the carriage 33 reaches the limit of its movement with the conveyor, its direction of movement is reversed so that the ware engaging portion 32 of the belt 15 wipes the bottles off the conveyor 14 onto the leer conveyor 11. This wiping action is assisted by the angular position of the part 32 of the belt and is also materially assisted by the movement of the belt in the direction of its length. The speed at which the belt rotates is preferably such as to reduce the frictional resistance between the belt and the bottles to a minimum, thereby minimizing the friction or rubbing action of the belt on the bottles, so that scratching or injury to the ware is avoided. The belt being made of or faced with comparatively soft flexible material, such as an asbestos composition, the liability of scratching or marring the surface of the ware is practically eliminated.

It will be noted that the speed of the carriage 33 being equal to that of the conveyor 14, the distance between each two adjacent bottles on the leer conveyor 11 will be only half the distance between adjacent bottles on the conveyor 14. The length and position of the shaft 23 is such that a full row of bottles will be placed on the leer conveyor each time the carriage travels to the left. During the return movement of the carriage to the right, the leer conveyor 11 is advanced so that the next succeeding row of bottles will be suitably spaced from the preceding row.

In another form of the invention (Figs. 6 and 7), the pusher belt 15 is set on edge, as in the preceding form, but has its ends secured to holders 60 at the upper ends of standards 61 located adjacent the opposed openings 13 in the leer walls 10. A coil spring 62 (Fig. 6) interposed between one end of the pusher belt 15 and the adjacent holder, tensions the belt so that the ware pushing portion 32 lying between the rollers 31 on the reciprocating carriage 33, is properly positioned to remove ware from the conveyor 14. A roller 63 over which one end of the belt rides, permits free lengthwise movement of the belt under influence of the tension spring 62. The threaded shaft 23 carries a sprocket 64 at one end, said sprocket having driving connection through a chain 65 or the like with a sprocket 66, the latter fixed to a shaft 67 upon which a bevel gear 68 is mounted. This gear runs in mesh with a driving bevel gear 69 at the upper end of a shaft 70 which may be rotated by any suitable means (not shown).

In this form, the carriage 33 is reciprocated along the screw shaft 23, whereby the rollers on said carriage impart to the ware pushing portion 32 of the belt 15 a movement substantially in the direction of the travel of ware through the leer. Thus, ware moving into the leer on the ware conveyor 14 and contacting with said portion 32 of the belt is pushed off of the hot belt or ware conveyor 14 and upon the leer conveyor 11. Due to reciprocation of the carriage 33, the ware pushing portions of the pusher belt 15 constantly shift across the width of the leer to thereby effect deposit of ware in rows extending transversely of the length of the leer.

Modifications may be resorted to within the spirit and scope of the invention.

What I claim is:

1. A leer feeder comprising in combination, a conveyor, means to move the conveyor whereby the latter may carry ware along a predetermined path, a flexible member extending lengthwise of and in part alongside the conveyor, a device to move portions of said member transversely of the path of travel of the ware with the conveyor, for removing the ware from the latter, and means to reciprocate the device lengthwise of said path.

2. A leer feeder comprising in combination, a conveyor, means to move the conveyor whereby the latter may carry articles along a predetermined path, a carriage adapted for reciprocation in parallelism to the path of travel of the conveyor, rollers on said carriage, said rollers positioned adjacent opposite edges of the ware conveyor and at points spaced apart lengthwise of the conveyor, an article pusher belt set on edge and extending across the leer, said belt engaging the rollers whereby a portion thereof is deflected across the path of travel of the conveyor to remove articles from the latter, and means for reciprocating the carriage.

3. A leer feeder comprising in combination, a conveyor, means to move the conveyor whereby the latter may carry articles along a predetermined path, a carriage adapted for reciprocation in parallelism to the path of travel of the conveyor, rollers on said carriage, said rollers positioned adjacent opposite edges of the ware conveyor and at points spaced apart lengthwise of the conveyor, an article pusher belt set on edge and extending across the leer, said belt engaging the rollers whereby a portion thereof is deflected across the path of travel of the conveyor to remove articles from the latter, means for reciprocating the carriage, and means for changing the spaced relation between said rollers and thereby varying the angular relation between the conveyor and the article engaging portion of the pusher belt.

Signed at Toledo, in the county of Lucas and State of Ohio, this 29th day of May, 1928.

ALBERT N. CRAMER.